United States Patent

[11] 3,615,841

| [72] | Inventors | Stanley W. Smith<br>Talcottville;<br>Edward I. Thiery, Winsted, Conn.; Jose D. Giner, Sudbury, Mass. |
|---|---|---|
| [21] | Appl. No. | 748,940 |
| [22] | Filed | July 31, 1968 |
| [45] | Patented | Oct. 26, 1971 |
| [73] | Assignee | Leesona Corporation<br>Warwick, R.I.<br>Continuation-in-part of application Ser. No. 491,826, Sept. 30, 1965, now abandoned. |

[54] ELECTROCHEMICAL CELL
10 Claims, No Drawings

[52] U.S. Cl. .................................................. 136/86,
136/120, 264/104, 264/127
[51] Int. Cl. .................................................. H01m 27/00,
H01m 13/00
[50] Field of Search .................................................. 136/120,
86, 9, 20, 24, 65, 67, 29; 264/61, 127, 104, 273;
260/33.6 F

[56] References Cited
UNITED STATES PATENTS

| 2,844,557 | 7/1958 | Welch | 260/43 |
|---|---|---|---|
| 3,219,730 | 11/1965 | Bliton et al. | 264/.5 |
| 3,348,975 | 10/1967 | Ziering | 136/120 |
| 3,385,736 | 5/1968 | Deibert | 136/120 |
| 3,386,859 | 6/1968 | Biddick | 136/120 |
| 3,389,105 | 6/1968 | Bolger | 260/23 |
| 2,730,597 | 1/1956 | Podolsky et al. | 201/63 |
| 3,010,536 | 11/1961 | Plurien et al. | 183/2 |

FOREIGN PATENTS

| 938,708 | 10/1963 | Great Britain | 136/86 |

Primary Examiner—Allen B. Curtis
Assistant Examiner—A. Skapars
Attorney—Alfred W. Breiner ABSTRACT: A method of forming lightweight electrodes is described comprising forming an admixture of electrochemically active metal and hydrophobic polymer in a fluid medium, applying said admixture to a porous metal support, lightly pressing the admixture into and around the metal support and thereafter heating in the absence of applied pressure at a temperature sufficient to bond said polymer particles to each other and to said support.

ELECTROCHEMICAL CELL

This application is a continuation-in-part of our copending application, Ser. No. 491,826 filed Sept. 30, 1965, now abandoned, entitled "Electrochemical Cell."

This invention relates to a novel process for the construction of electrodes for use in an electrochemical device such as a fuel cell and to the electrodes made by the novel process. More particularly, the invention embraces a process for the construction of low thickness, lightweight electrodes having low internal electrical resistance. For convenience, hereinafter the process for preparing electrodes will be described with emphasis being placed on the use of the electrodes in a fuel cell. It will be apparent, however, that electrodes of the process can be employed in other electrochemical devices where similar considerations apply.

In the art, the advantages of lightweight electrodes for use in fuel cells have been recognized. These electrodes conventionally comprise a porous metal support coated with a catalytic material such as a dispersion of noble metal black and hydrophobic polymer. The electrodes are extremely thin having low internal electrical resistance and, furthermore, take up only a very small amount of space permitting the construction of highly compact cells having a high energy to volume and energy to weight ratio. It has been found, however, that is is difficult to provide electrodes which have the catalytic particles and hydrophobic polymer particles uniformly distributed throughout the electrode structure. Further, and possibly more critically, it is difficult to obtain reproducibility in the electrodes.

Accordingly, it is an object of the present invention to provide an improved process for the construction of thin, lightweight electrodes with the process being highly reproducible.

It is another object of this invention to provide improved electrodes having high electrochemical activity at low temperatures.

These and other objects of the invention will be more readily apparent from the following detailed description with particular emphasis being placed on the working examples.

The objects of the invention are accomplished by applying an admixture of electrochemically active metal particles and hydrophobic polymer to at least one major surface of a porous metal support. The critical step of the process is in the uniform application. According to one embodiment of the invention, an intimate mixture is made of the electrochemically active catalyst and an aqueous suspension of the finely divided hydrophobic polymer. The mixture is kneaded into a doughlike mass which excludes the major portion of the water. The mixture is then rolled into a thin flat sheet and pressed onto and into a metal support with a press, using only sufficient pressure to ensure that the mass extends through the screen. Thereafter, the electrode is heated in the absence of applied pressure at an elevated temperature sufficient to sinter the polymer particles to each other and to the metal support. Electrodes constructed according to this embodiment have excellent flexibility and the active material adheres tightly to the metal support. As will be apparent, although being preferred, the water can be replaced with other fluid mediums.

In a second embodiment, a solution or colloidal suspension of the hydrophobic polymer with the electrochemically active material uniformly dispersed therein is made using a suitable solvent such as xylene. The mixture is applied to the screen with a brush or a flat doctors blade and dried at low temperature. The total structure is then rolled lightly and heated in the absence of applied pressure at a temperature elevated sufficiently to sinter the hydrophobic polymer particles bonding them to each other and to the metal support. The electrodes made in this manner have good mechanical stability and the active material adheres well to the metal support. In a third embodiment, the dissolved polymer and electrochemically active catalyst uniformly dispersed therein is sprayed onto the metal support and after preliminary drying is rolled or pressed lightly and cured in the absence of applied pressure at elevated temperatures for a prolonged period of time. The resultant electrodes are extremely thin, light in weight, and possess a high degree of mechanical integrity after extended periods of operation in a fuel cell. More critically, however, the electrodes made according to the invention are highly reproducible.

According to the present invention, the metal support can be a metal screen, expanded metal, metal felt or mesh. It is essential that the structure be electrochemically conductive and able to withstand the corrosive environment of a fuel cell. Suitable metal supports which are preferably from 0.5 to 1.0 millimeters thick, with the mesh size being from 50 to 150, are composed of nickel, copper, iron, titanium, tantalum, zirconium, gold, silver, and alloys thereof. Primarily from the standpoint of their exceptional resistance to the corrosive environments of the cell and their relative inexpensiveness, nickel, titanium and tantalum supports are preferred.

The polymer which is dispersed with the catalytic metal which is applied to the metal support must be relatively hydrophobic. Exemplary polymers include polytetrafluoroethylene, polytrifluorochloroethylene, polyvinylfluoride, polyvinylidenefluoride, polytrifluoroethylene, and copolymers thereof. However, because of its exceptional hydrophobicity, as well as its resistance to heat and the corrosive environment of the electrolyte, polytetrafluoroethylene is preferred.

The electrochemically active metal which is to be applied to the metal support as a dispersion with the hydrophobic polymer can be any of various metals which will favorably influence an electrochemical reaction. Such metals include columbium, nickel, iron, gold, copper, palladium, platinum, rhodium, ruthenium, osmium, and iridium, and alloys thereof. However, because of their excellent properties insofar as favorably influencing an electrochemical reaction, the Group VIII metals of Mendelyeev's Periodic Table are preferred.

In the preparation of the admixture of electrochemically active material and hydrophobic polymer, the suspending or solvent medium will vary depending upon the particular polymer selected. Thus, polytrifluoroethylene will dissolve or form a colloidal dispersion in xylene. Other polymers, however, may be more compatible with solvents such as ethyl acetate, ethyl acetoacetate, methyl isobutyl ketone, methyl ethyl ketone, and the like. The ratio of polymer to catalytic metal in the dispersion is not critical. Normally, the desideratum is to have as light a load of the catalytic metal as possible but with a high surface area exposed for electrochemical reaction. In the usual construction, the catalytic metal-polymer admixture will contain from about 90 to 55 percent metal and from 10 to 45 percent polymer on a weight basis. The optimum percentage is from about 65 to 90 percent metal and from 35 to 10 percent polymer on a weight basis.

Although the heating of the electrode structure at elevated temperatures to sinter at least the polymer particles to obtain bonding is essential to obtaining an electrode with high mechanical stability, the temperature of the sintering and the time of the operation can vary over a substantial range. Thus, normally, the temperature of the sintering operation will be from about 180° C. to 325° C. for periods varying from 5 to 45 minutes. Inasmuch as there is a relationship between time and temperature, within limits, if the temperature is increased, the time of the sintering operation can be reduced. It has been found, however, that greater reproducibility is obtained if the temperature is maintained between 220° C. and 300° C. for periods of about 10 to 35 minutes. The sintering operation can be carried out in conventional draft furnaces in an atmosphere of air.

The electrodes prepared by the process of the present invention can be employed in fuel cells employing any of the prior art electrolytes such as the alkali metal hydroxides and acid electrolytes such as sulfuric and phosphoric acid. It is only essential that the electrolyte remain invariant, or substantially invariant, under the operating conditions of the cell. Additionally, the electrodes can be employed with various fuels including hydrogen, the hydrocarbons, and ammonia. By properly selecting the catalytic metal, enhanced results can be obtained with any particular fuel. Additionally, by judiciously selecting the catalytic metal, a good cathode can be obtained for operation on air.

Having described the invention in general terms, the following examples are set forth to more particularly illustrate the invention. Parts are by weight unless otherwise specified.

EXAMPLE 1

An intimate mixture is prepared from platinum black and an aqueous suspension of finely divided polytetrafluoroethylene particles. The suspension contained 70 weight percent platinum black and 30 weight percent PTFE. After the platinum black and PTFE are uniformly admixed, the mixture is kneaded into a doughlike mass which excludes the major portion of the water. The mixture is then rolled into a thin flat sheet and pressed into a 50 mesh tantalum screen having a wire diameter of 0.003 inch and a weight of 28.5 mg./cm.$^2$ with a press, using only sufficient pressure to ensure that the sheetlike mass extends through the screen. The electrode is then sintered in the absence of applied pressure in a furnace at 600° F. for 30 minutes. The electrode has excellent flexibility and the active material adheres tightly to the screen.

The electrode so formed was tested in a fuel cell as the anode and fed with pure hydrogen at 25° C. The electrolyte was a 30 percent aqueous solution of 5N $H_2SO_4$. The cell provided current densities as follows:

| Cell Voltage mv. | Current Density ma./cm.$^2$ |
| --- | --- |
| 750 | 100 |
| 882 | 20 |

EXAMPLE 2

A solution or colloidal dispersion of polytrifluorochloroethylene at 50 percent nonvolatile was prepared in xylene. Thereafter, platinum black was uniformly suspended in the solvent. The mixture is applied to a 50 mesh tantalum screen having a wire diameter of 0.003 inch and a weight of 28.5 mg./cm.$^2$ by spraying and dried at 75° C. for 30 minutes in a draft furnace. The electrode contained 5 mg./cm.$^2$ of platinum. The structure was rolled lightly and thereafter sintered in the absence of applied pressure at 250° C. for 30 minutes. The electrode had good mechanical stability and the active material adheres well to the screen.

The electrode so formed was tested in a fuel cell as the anode and fed with pure hydrogen at 25° C. The electrolyte was 5N sulfuric acid. The cell provided current densities as follows:

| Cell Voltage mv. | Current Density ma./cm.$^2$ |
| --- | --- |
| 670 | 90 |
| 693 | 45 |

In examples 1 and 2, the metal support screen can be replaced with other metal supports including copper, silver, gold, iron and platinum. Additionally, the metal of the catalytic layer can be replaced by other electrochemically active materials including nickel, copper, gold, silver, palladium, ruthenium, and rhodium. The hydrophobic polymer can be replaced with other polymers including polystyrene, polyethylene, polytrifluoroethylene, polyvinylfluoride, and copolymers thereof. Additionally, the solvents employed can be any material which is compatible with the hydrophobic polymer such as methyl ethyl ketone, methyl isopropyl ketone, methyl isobutyl ketone, ethyl acetate, and ethyl acetyl acetate.

As will be apparent to one skilled in the art, the illustrative examples are only set forth as preferred embodiments of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

It is claimed:

1. A method of constructing a lightweight electrode comprising the steps of forming a uniform admixture of finely divided electrochemically active metal particles and hydrophobic polymer particles in a fluid medium, forming said admixture into a unitary layer and heating in the absence of applied pressure at a temperature elevated sufficiently to bond the hydrophobic polymer particles to each other, thereby providing an open, porous surface, and disposing said electrode in an electrochemical cell for generating electricity.

2. The method of claim 1, including the step of kneading the admixture into a doughlike mass to remove the major portion of the fluid medium and wherein the unitary layer is formed by rolling the admixture into a thin film.

3. The method of claim 2, including the step of pressing said thin film into a porous metal support.

4. The method of claim 3 wherein the fluid medium is water.

5. The method of claim 4 wherein the hydrophobic polymer is polytetrafluoroethylene.

6. The method of claim 1 wherein said uniform admixture is formed by dispersing the hydrophobic polymer particles in a fluid medium and said metal particles are added to the dispersion.

7. The method of claim 6 wherein the unitary layer is formed by spraying said admixture onto a porous metal support and lightly pressing the resultant structure.

8. The method of claim 6 wherein the fluid medium is xylene and the hydrophobic polymer is polytrifluorochloroethylene.

9. The method of claim 7 wherein the metal support is tantalum.

10. The method of claim 1 wherein the electrochemically active metal is selected from the group consisting of columbium, nickel, iron, gold, copper, palladium, platinum, rhodium, ruthenium, osmium, and iridium.

* * * * *